(12) United States Patent
Sun et al.

(10) Patent No.: US 10,397,263 B2
(45) Date of Patent: Aug. 27, 2019

(54) HIERARCHICAL PATTERN MATCHING FOR DEEP PACKET ANALYSIS

(71) Applicant: Futurewei Technologies, Inc., Plano, TX (US)

(72) Inventors: Yan Sun, Santa Clara, CA (US); Wei Xu, Dublin, CA (US)

(73) Assignee: Futurewei Technologies, Inc., Plano, TX (US)

( * ) Notice: Subject to any disclaimer, the term of this patent is extended or adjusted under 35 U.S.C. 154(b) by 199 days.

(21) Appl. No.: 15/496,322

(22) Filed: Apr. 25, 2017

(65) Prior Publication Data

US 2018/0309776 A1    Oct. 25, 2018

(51) Int. Cl.
*H04L 12/26*      (2006.01)
*H04L 29/06*      (2006.01)

(52) U.S. Cl.
CPC ........ *H04L 63/1433* (2013.01); *H04L 43/028* (2013.01); *H04L 63/0245* (2013.01); *H04L 63/1416* (2013.01)

(58) Field of Classification Search
CPC   H04L 63/1433; H04L 63/0245; H04L 43/028
See application file for complete search history.

(56) References Cited

U.S. PATENT DOCUMENTS 7,353,332 B2 *   4/2008   Miller ................ H04L 45/7453
                                                    365/49.1
7,916,510 B1 *   3/2011   Starovoitov ...... G06F 16/90344
                                                    365/49.1
8,051,085 B1 *  11/2011   Srinivasan .......... H04L 63/1416
                                                    707/737
9,430,646 B1     8/2016   Mushtaq et al.
10,121,541 B2 * 11/2018   Igaue ..................... G11C 15/04
(Continued)

FOREIGN PATENT DOCUMENTS

CN       102307189 A      1/2012
WO       2016180211 A1   11/2016

OTHER PUBLICATIONS

Machine Translation and Abstract of Chinese Publication No. CN102307189, Jan. 4, 2012, 25 pages.

(Continued)

*Primary Examiner* — Saleh Najjar
*Assistant Examiner* — Louis C Teng
(74) *Attorney, Agent, or Firm* — Conley Rose, P.C.

(57) ABSTRACT

A method comprising receiving, by a network element, a data packet, searching, by the network element, the received data packet at a first hierarchical level to determine whether a substring of a string of a regular expression exists in the received data packet, searching, by the network element when the search of the received data packet at the first hierarchical level finds a match, the received data packet at a second hierarchical level to determine whether the string of the regular expression exists in the received data packet, and transmitting, by the network element, the received data packet to a next network element along an original path of the received data packet without searching the received data packet at a third hierarchical level when the search of the received data packet at the first or second hierarchical level does not find a match.

16 Claims, 4 Drawing Sheets

(56) References Cited

U.S. PATENT DOCUMENTS

| | | | | |
|---|---|---|---|---|
| 2007/0083646 | A1* | 4/2007 | Miller | H04L 45/7453 709/224 |
| 2007/0133593 | A1* | 6/2007 | Shankara | H04L 45/00 370/463 |
| 2008/0212581 | A1* | 9/2008 | Miller | H04L 45/7453 370/389 |
| 2012/0221494 | A1* | 8/2012 | Pasetto | G06N 5/00 706/12 |
| 2015/0295891 | A1* | 10/2015 | Goyal | H04L 63/0209 726/11 |
| 2017/0060438 | A1* | 3/2017 | Igaue | G11C 15/04 |

OTHER PUBLICATIONS

Machine Translation and Abstract of International Publication No. WO2016180211, Nov. 17, 2016, 18 pages.

Foreign Communication From a Counterpart Application, PCT Application No. PCT/CN2018/081490, English Translation of International Search Report dated May 31, 2018, 5 pages.

Foreign Communication From a Counterpart Application, PCT Application No. PCT/CN2018/081490, English Translation of Written Opinion dated May 31, 2018, 4 pages.

Choi, et al., "DFC: Accelerating String Pattern Matching for Network Applications," Proceedings of the 13th USENIX Symposium on Networked Systems Design and Implementation (NSDI '16), Mar. 16-18, 2016, Santa Clara, CA, USA, 16 pages.

Valgenti, et al., "GPP-Grep: High-Speed Regular Expression Processing Engine on General Purpose Processors," Proceedings RAID, 2012, pp. 334-353.

Liu, et al., "Towards Fast and Optimal Grouping of Regular Expressions via DFA Size Estimation," IEEE Journal on Selected Areas in Communications, vol. 32, No. 10, Oct. 2014, pp. 1797-1809.

Paxson, V., "Bro: A system for Detecting Network Intruders in Real-Time," Computer Networks, vol. 31, No. 23-24, Dec. 14, 1999, 22 pages.

Bremlar-Barr, A., et al., "CompactDFA: Generic State Machine Compression for Scalable Pattern Matching," in Proceedings of the 29th Conference on Information Communications, Mar. 14-19, 2010, 9 pages.

"Snort User Manual 2.8.6," The Snort Project, http://www.snort.org/assets/140/snortmanual286.pdf, Apr. 26, 2010, 191 pages.

Dreger, H., et al., "Operational Experiences with High-Volume Network Intrusion Detection," Proceedings of the 11th ACM Conference on Computer and Communications Security, Oct. 25-29, 2004, 10 pages.

Paolieri, M., et al., "ReCPU: a Parallel and Pipelined Architecture for Regular Expression Matching," Proceedings of 15th Annual IFIP on Very Large Scale Integration, Oct. 15-17, 2007, 20 pages.

Becchi, M., et al., "A Hybrid Finite Automaton for Practical Deep Packet Inspection," Proceedings of ACM CoNEXT, Dec. 10-13, 2007, 12 pages.

\* cited by examiner

HIERARCHICAL PATTERN MATCHING FOR DEEP PACKET ANALYSIS

BACKGROUND

Many security applications are based on deep packet inspection (DPI) to examine headers and payloads of data packets for security threats such as malicious code. Often, pattern matching is employed to examine the data packets. Pattern matching is a process by which received data is compared to stored data to determine whether a match exists between the received data and the stored data.

SUMMARY

According to one aspect of the present disclosure, there is provided an apparatus comprising a memory comprising executable instructions and one or more processors coupled to the memory. The one or more processors execute the instructions to receive a data packet, search the received data packet at a first hierarchical level to determine whether a substring of a string of a regular expression exists in the received data packet, determine the search of the received data packet at the first hierarchical level found a match and, based thereon, search the received data packet at a second hierarchical level to determine whether the string of the regular expression exists in the received data packet, and transmit the received data packet to the next network element along an original path of the received data packet without searching the received data packet at a third hierarchical level when the search of the received data packet at the first or second hierarchical level does not find a match.

Optionally, in any of the preceding aspects, the apparatus further comprises a first content addressable memory (CAM), wherein the one or more processors execute the instructions to search the received data packet at the first hierarchical level at least in part using the first CAM.

Optionally, in any of the preceding aspects, the first CAM stores the substring as a plurality of binary bits which are each individually searchable.

Optionally, in any of the preceding aspects, the received data packet comprises a plurality of binary bits, wherein the first CAM is configured to compare the plurality of binary bits of the received data packet to the plurality of binary bits of the substring in parallel.

Optionally, in any of the preceding aspects, the apparatus further comprises a second CAM, wherein the one or more processors execute the instructions to search the received data packet at the second hierarchical level at least in part using the second CAM.

Optionally, in any of the preceding aspects, the second CAM stores the string as a binary value comprising a plurality of binary bits which are each individually searchable.

Optionally, in any of the preceding aspects, the one or more processors further execute the instructions to receive a second data packet, search the received second data packet at the first hierarchical level to determine whether a second substring of a second string of a second regular expression exists in the received second data packet, search the received second data packet at the second hierarchical level when the search of the received second data packet at the first hierarchical level finds a match to determine whether the second string of the second regular expression exists in the received second data packet, search the received second data packet at a third hierarchical level to determine whether the second regular expression exists in the received second data packet, prevent transmission of the received second data packet to the next network element along an original path of the received data packet when the search of the received data packet at the third hierarchical level finds a match, and transmit the received second data packet to the next network element along an original path of the received second data packet when the search of the received data packet at the third hierarchical level does not find a match.

According to one aspect of the present disclosure, there is provided an apparatus comprising a first binary CAM (BCAM) configured to search for a substring of a string of a regular expression in a received data packet, a second BCAM configured to search for the string in the received data packet when the substring is found in the received data packet, and a first processor programmed to search for the regular expression in the received data packet when the string is found in the received data packet.

Optionally, in any of the preceding aspects, the first processor is further programmed to implement a finite state machine to search for the regular expression.

Optionally, in any of the preceding aspects, the finite state machine is at least one of a deterministic finite state machine or a non-deterministic finite state machine.

Optionally, in any of the preceding aspects, the first BCAM is configured to store a binary representation of the substring comprising a plurality of bits, compare the plurality of bits of the substring to a plurality of bits of the received data packet, and output a match result indicating a match between the substring and the received data packet when the plurality of bits of the substring matches the plurality of bits of the received data packet.

Optionally, in any of the preceding aspects, the second BCAM is configured to store a binary representation of the string comprising a plurality of bits, compare the plurality of bits of the string to a plurality of bits of the received data packet, and output a match result indicating a match between the string and the received data packet when the plurality of bits of the string matches the plurality of bits of the received data packet.

Optionally, in any of the preceding aspects, the apparatus further comprises a second processor programmed to schedule the received data packet for analysis by the second BCAM when the first BCAM determines that the substring is found in the received data packet and transmit the received data packet according to a bypass path that bypasses the second BCAM and the first processor when the first BCAM determines that the substring is not found in the received data packet.

Optionally, in any of the preceding aspects, the apparatus further comprises a third processor configured to schedule the received data packet for analysis by the first processor when the second BCAM determines that the string is found in the received data packet and transmit the received data packet according to a bypass path that bypasses the first processor when the second BCAM determines that the string is not found in the received data packet.

According to one aspect of the present disclosure, there is provided a method comprising receiving, by a network element, a data packet, searching, by the network element, the received data packet at a first hierarchical level to determine whether a substring of a string of a regular expression exists in the received data packet, determining that search of the received data packet at the first hierarchical level found a match and, based thereon, searching, by the network element, the received data packet at a second hierarchical level to determine whether the string of the regular expression exists in the received data packet, and transmitting, by the network element, the received data packet to a next network element along an original path of the received data packet without searching the received data packet at a third hierarchical level when the search of the received data packet at the first or second hierarchical level does not find a match.

Optionally, in any of the preceding aspects, the method further comprises searching, by the network element when the search of the received data packet at the second hierarchical level finds a match, the received data packet at the third hierarchical level to determine whether the regular expression exists in the received data packet, preventing, by the network element, transmission of the received data packet to the next network element along the original path of the received data packet when the search of the received data packet at the third hierarchical level finds a match, and transmitting, by the network element, the received data packet to the next network element along an original path of the received data packet when the search of the received data packet at the third hierarchical level does not find a match.

Optionally, in any of the preceding aspects, the network element performs the searching at the first hierarchical level and the second hierarchical level using a plurality of CAMs.

Optionally, in any of the preceding aspects, at least one of the CAMs is a BCAM.

Optionally, in any of the preceding aspects, the network element performs the searching at the third hierarchical level using a finite state machine.

Optionally, in any of the preceding aspects, the network element is further configured to transmit the received data packet to a second network element for further analysis when the search of the received data packet at the third hierarchical level finds a match.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are embodiments that provide for hierarchical analysis of data to determine existence of, for example but not limited to, potentially malicious code included within the data. The disclosed embodiments are implemented, for example, by a network element operating as a filter or firewall that searches received data against stored data prior to transmitting the received data to a next node along an intended or original path of the received data. In various embodiments, received data is searched hierarchically at a first level to determine whether substrings of the stored data are found in the received data, at a second level to determine whether strings of the stored data are found in the received data, and at a third level to determine whether a regular expression of the stored data is found in the received data. When a match between the received data and the stored data is not found at a level of the hierarchical analysis, the received data may be transmitted to a next node along an intended or original path of the received data without undergoing further analysis according to the remaining levels of the hierarchical analysis. The hierarchical analysis is performed according to hardware, software, or a combination of both. For example, the hierarchical analysis is at least partially implemented using hardware capable of searching for multiple substrings or strings in parallel to result in a comparatively fast search time. The hardware may further have a comparatively small physical size, component count, and power consumption, thereby increasing an efficiency of the hierarchical analysis.

In DPI, pattern matching is performed to identify known patterns which may be, for example, potentially malicious and may appear anywhere in received data. While the data may be discussed herein as being inspected for potentially malicious code, the data may be inspected for other reasons as well according to the various embodiments provided herein. However, software implementations of the pattern matching may result in a bottleneck or reduction in throughput, efficiency, or performance as a result of complexity of the pattern matching, patterns being searched for, and/or quantity of received data. Hardware solutions such as finite state machines (e.g., a deterministic finite state machine, also sometimes referred to as a deterministic finite automaton (DFA) or a nondeterministic finite state machine, also sometimes referred to as nondeterministic finite automaton (NFA)) or a ternary content addressable memory (CAM) (TCAM) have been implemented to perform the pattern matching. However, each has certain complexities such as data size requirements, physical size, power consumption, circuit complexity, component count, elapsed time for searches, and other considerations which may result in certain tradeoffs in functionality. In contrast, a binary CAM (BCAM) has comparatively lower power consumption, physical size, circuit complexity, component count, flexibility in data size requirements, and operates rapidly by searching in parallel. However, a BCAM lacks a "don't care" state of a TCAM (e.g., a state in which it is irrelevant to decision making by the TCAM whether a data bit is a "0" or a "1"), which may be commonly used in pattern matching. Therefore, embodiments which are capable of utilizing BCAMs in performing pattern matching are desirable. The present disclosure addresses the problem of the prior art by enabling implementation of a hierarchical analysis of received data (e.g., hierarchical pattern matching for DPI) through the use of at least some BCAMs, thereby increasing a throughput of a network element or device performing the hierarchical analysis of the received data.

Figure 1:
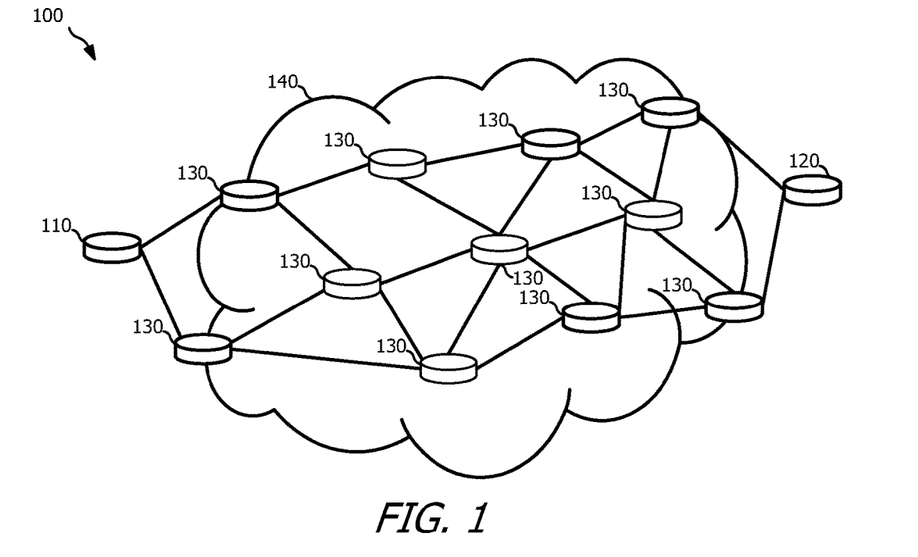
FIG. 1 is an embodiment of a network.

Referring now to FIG. 1, an embodiment of a network architecture 100 is shown. The network architecture 100 comprises a client device 110, a content provider 120, and a plurality of nodes 130 disposed in a network 140 (e.g., a public or private network). One or more of the nodes 130 couple the client device 110 to the content provider 120 to, for example, facilitate transmission of data between the client device 110 and the content provider 120. In various embodiments, the client device 110 is any network element configured to receive data. For example, the client device 110 may be a mobile communication device, a tablet computer, a desktop computer, a laptop computer, a server, an Internet of Things (IoT) device, or any other electronic device or network element that includes data communication functionality. In various embodiments, the content provider 120 is any network element configured to provide data. For example, the content provider 120 may be a mobile communication device, a tablet computer, a desktop computer, a laptop computer, a server, an IoT device, or any other electronic device or network element that includes data communication functionality. In various embodiments, each of the nodes 130 is any network element configured to facilitate communication of data between two points (e.g., the client device 110 and the content provider 120) in the network architecture 100. For example, any one or more of the nodes 130 may be a router, a network switch, a firewall, an intrusion prevention system, an intrusion detection system, a network filter, a network security device, or other like devices. Additionally, any one or more of the nodes 130 may include multiple functionalities, for example, functionality as both a router and a network filter, etc. Furthermore, in some embodiments the client device 110 and/or the content provider 120 may include at least some functionality of a node 130 (e.g., a firewall, filter, or other network security related functionality).

The content provider 120 is configured to provide content (e.g., data) to the client device 110. The content is provided, in some embodiments, in response to a request message received by the content provider 120 from the client device 110. In other embodiments, the content provider 120 provides the content to the client device 110 without receiving a request for the content from the client device 110. The content may be, for example, media content, a web page (e.g., comprising any combination of text and media based content), text-based content, instant messaging communications, an electronic mail (email) message, or any other data capable of being transmitted through a network. In some embodiments, the content provider 120 may also be a client which receives content from another source and the client device 110 may also be a content provider 120 which provides content to another destination.

When transmitted from the content provider 120 to the client device 110, data traverses one or more of the nodes 130 as one or more data packets (e.g., Ethernet packets, Internet Protocol packets, user datagram protocol packets, transmission control protocol packets, and so on). For example, at least some of the nodes 130 may be routers that route the data through the network architecture 100. One or more of the nodes 130 is configured to analyze the data sent from the content provider 120 to the client device 110 prior to receipt of the data by the client device 110. The one or more nodes 130 analyze the data, for example, to determine whether the data contains portions (e.g., one or more code segments, text strings, patterns of binary bits, etc.) which may be malicious. Data portions that may be malicious include, for example, a virus, malware, spyware, ransomware, and other like software which may inhibit the normal operation of the client device 110 at some time after receipt of the data containing the malicious data portions. The nodes 130 determine that the data portions are malicious, for example, by comparing the data traversing the network architecture 100 to data portions which are known to be malicious. The data portions which are known to be malicious are provided to the nodes 130 (or patterns which may be found in, or indicative of, the data portions which are known to be malicious), in some embodiments, as one or more rules which are stored by the nodes 130 for use in analyzing the data.

As described in greater detail below, in some embodiments one or more of the nodes 130 analyze the data hierarchically to determine whether the data contains portions which may be malicious. For example, the nodes 130 analyze the data at a first level to determine whether any one or more substrings (a combination of two or more characters) of the data portions which are known to be malicious are present in a data packet. For example, for the following discussion, the expression "attack.start.root" is used to represent the data which may be malicious. The expression "attack.start.root" is referred to, in some embodiments, as a regular expression (e.g., an expression comprising a plurality of characters which together form a search pattern). The regular expression may be divided into three strings, "attack", "start", and "root". Each of these strings may then be further divided into multiple substrings. Using "attack" as an example, the string may be further divided into five two-character substrings, "at", "tt", "ta", "ac", and "ck". When a substring of the regular expression is present in the data packet, the data packet is next analyzed to determine whether strings (e.g., multiple substrings which together form one or more words or other groups of characters) of the regular expression are present in a data packet. When substrings of the regular expression are not present in the data packet, the data packet is transmitted by the node 130 which analyzed the data packet to a next downstream (or upstream) device in the network architecture 100. While discussed as two-character substrings, the substrings may be any suitable length such as two characters, three characters, four characters, etc. A shorter length of the substrings, in some embodiments, results in a greater number of data packets being analyzed to determine whether strings of the regular expression are present in a data packet. A shorter length of the substrings may also result in a smaller amount of physical and/or data storage space occupied by hardware, software, and/or stored data needed to analyze the data to determine whether any one or more of the substrings of the regular expression are present in a data packet. A longer length of the substring, in some embodiments, results in a lesser number of data packets being analyzed to determine whether strings of the regular expression are present in a data packet. A longer length of the substrings may also result in a larger amount of physical and/or data storage space occupied by hardware, software, and/or stored data needed to analyze the data to determine whether any one or more of the substrings of the regular expression are present in a data packet.

When a substring of the regular expression is present in the data packet (e.g., "at", "tt", "ta", "ac", or "ck"), the data packet is next analyzed at a second level to determine whether a string of the regular expression is present in the data packet. As discussed above, in at least some embodiments, at least some of the strings are a concatenation of at least some of the substrings which were compared against the data packet by the nodes 130 at the first level. When a string of the regular expression is present in the data packet (e.g., "attack", "start", or "root"), the data packet is next analyzed to determine whether the entire regular expression (e.g., "attack.start.root") is present in the data packet. When the string of the regular expression is not present in the data packet, the data packet is transmitted by the node 130 which analyzed the data packet to a next downstream (or upstream) device in the network architecture 100.

When the string of the regular expression is present in the data packet, the data packet is next analyzed at a third level to determine whether the entire regular expression (e.g., "attack.start.root") is present in the data packet. When the entire regular expression is present in the data packet, the data packet is prevented from continuing on to the next downstream (or upstream) device in the network architecture 100 (e.g., by dropping the data packet) and/or may be further processed or transmitted to a secure device for further analysis. When the entire regular expression is not present in the data packet, the data packet is transmitted by the node 130 which analyzed the data packet to a next downstream (or upstream) device in the network architecture 100. By analyzing the data packet in the hierarchical manner described above and in greater detail below, the nodes 130 improve a data throughput rate by reducing a number of the data packets analyzed according to the above described pattern matching in order to identify regular expressions.

In some embodiments, regular expressions may range in size from a single byte of data to hundreds of bytes of data or more. Performing pattern matching on every received data packet passing through a node 130 for each regular expression that might exist in the data packet (e.g., as defined by a set of rules or databases containing a listing of potentially malicious code) may be a time consuming and computationally complex task. For example, most data packets are likely to contain no malicious code, yet pattern matching is performed for each regular expression that might exist in the data packet on every data packet passing through the node 130. By employing the disclosed hierarchical analyzation (e.g., hierarchical pattern matching for deep packet inspection), the nodes 130 may perform an expedited pattern matching using substrings and/or strings of the regular expression to determine whether the regular expression exists in the data packet. Further, according to an embodiment, the expedited pattern matching creates a fast or bypass method for the nodes 130 to transmit or forward data packets which do not contain substrings and/or strings of the regular expression without performing pattern matching of every regular expression with every data packet passing through the nodes 130. For example, when a substring of the regular expression is not present in the data packet, the node 140 may skip searching the data packet for the string of the regular expression or the full regular expression. Similarly, when a substring of the regular expression is present in the data packet but a string of the regular expression is not found in the data packet, the node 130 may skip searching the data packet for the full regular expression.

Figure 2:
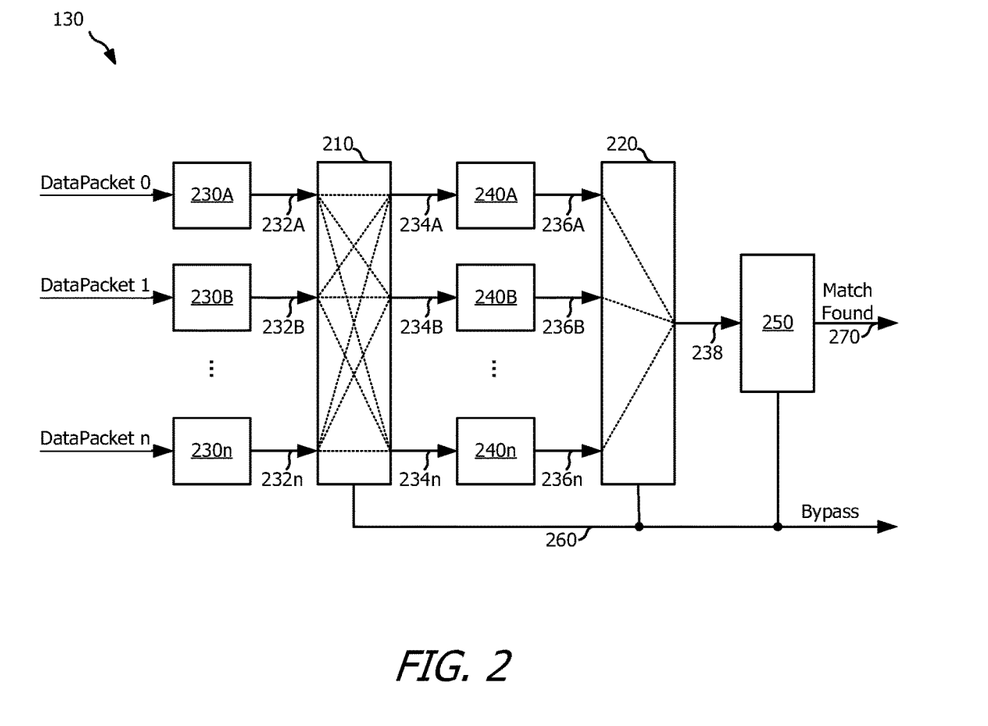
FIG. 2 is an embodiment of a node configured to perform hierarchical pattern matching.

Referring now to FIG. 2, an embodiment of a node 130 configured to perform the hierarchical pattern matching discussed above with respect to FIG. 1 is shown. The node 130 comprises a first controller 210, a second controller 220, a plurality of substring matching circuits 230 (illustrated as substring matching circuits 230A-230n), a plurality of string matching circuits 240 (illustrated as string matching circuits 240A-240n), and a regular expression matching circuit 250.

In some embodiments, each of the plurality of substring matching circuits 230A-230n comprises a CAM (not shown). Each of the plurality of substring matching circuits 230A-230n optionally may also comprise additional circuitry (e.g., logic circuitry or other supporting circuitry) configured to interact with the CAM. For example, the substring matching circuits 230A-230n may each comprise a BCAM or a TCAM. The substring matching circuits 230A-230n are configured to compare a received binary value (denoted as Datapacket 0 to Datapacket n) to one or more stored binary values to determine whether a match exists between the received binary value and the one or more stored binary values. The stored binary values are, for example, binary representations of the two-character (e.g., American Standard Code for Information Interchange (ASCII) character) substrings of the regular expression. For example, for the two-character substring of "at", the binary representation may be "0110000101110100". Each of the substring matching circuits 230A-230n may store binary representations of any number of the two-character substrings for comparison to received binary data. For example, the substring matching circuits 230A-230n may store binary representations of the two-character substrings for only some substrings of a string, all substrings of string, substrings of multiple strings, all substrings existing in the regular expression, or any other suitable number of substrings. The binary representations of the two-character substrings may be represented using any suitable number of binary bits. For example, as shown above, in some embodiments the two-character strings are represented by sixteen bits (e.g., eight bits for the first ASCII character of the substring and eight bits for the second ASCII character of the substring). Each bit of the binary representations of the two-character substrings is stored, in some embodiments, separately in the substring matching circuits 230A-230n (e.g., with each bit being stored in a separate static random access memory (SRAM) cell (not shown)). Additionally, when multiple substrings having the same characters appear in the regular expression, the substring matching circuits 230A-230n may store a single binary representation of the substring, thereby reducing redundancy and computational requirements (e.g., hardware and/or software).

Each of the substring matching circuits 230A-230n receives a data packet comprising binary data (e.g., a plurality of binary bits). The plurality of binary bits of the received data packets are compared by each of the substring matching circuits 230A-230n to each of the stored binary representations of the two-character substrings and a binary output is generated by each of the substring matching circuits 230A-230n and transmitted to the first controller 210. The binary output indicates a match or a miss for a respective substring of the regular expression. For example, for the five substrings of "attack," discussed above with respect to FIG. 1, the binary output may comprise five bits with each bit corresponding to one of the five substrings. When the substring matching circuits 230A-230n find a match in any one of the substrings of the regular expression in the data packets being analyzed, a bit of the binary output corresponding to that substring is set to 1. When the substring matching circuits 230A-230n do not find a match in any one of the substrings of the regular expression in the data packets being analyzed, a bit of the binary output corresponding to that substring is set to 0.

The first controller 210 is coupled to each of the substring matching circuits 230A-230n via lines 232A, 232B, and 232n, respectively, and receives both the binary output of each respective substring matching circuit 230A-230n and the data packets analyzed by the respective substring matching circuits 230A-230n via the lines 232A, 232B, and 232n, respectively. When the binary output indicates that no substrings of the regular expression were found in a data packet, in some embodiments the first controller 210 transmits the data packet according to a bypass path 260 that bypasses further analysis of the data packet. When the binary output indicates that one or more substrings of the regular expression were found in a data packet, in some embodiments the first controller 210 schedules the data packet for analysis by the string matching circuits 240A-240n. For example, the first controller 210 schedules the data packet for analysis by placing the data packet in a queue (not shown) associated with a respective string matching circuit 240A-240n. In some embodiments, the first controller 210 schedules the data packet for analysis by a respective string matching circuit 240A-240n only when a number of substrings greater than a threshold (e.g., 1 substring, 2 substrings, 5 substrings, etc.) are found by the substring matching circuits 230A-230n. In this way, existence of a common substring (e.g., such as a common word like "it" which might be found as a substring in numerous other words) does not alone cause the data packet to be scheduled for analysis by a respective string matching circuit 240A-240n, while existence of multiple substrings greater than a threshold will cause the data packet to be scheduled for analysis by a respective string matching circuit 240A-240n. When a number of substrings found by the substring matching circuits 230A-230n does not exceed the threshold, the first controller 210 may transmit the data packet according to the bypass path 260 that bypasses further analysis of the data packet.

The string matching circuits 240A-240n are each coupled to the first controller 210 via lines 234A, 234B, and 234n, respectively, and receive the data packets for further analysis from the first controller 210 (e.g., the data packets in which at least some of the substrings of the regular expression were found by the substring matching circuits 230A-230n) via the lines 234A, 234B, and 234n, respectively. In some embodiments, each of the plurality of string matching circuits 240A-240n comprises a CAM (not shown), such as a BCAM or a TCAM. Each of the plurality of string matching circuits 240A-240n optionally may also comprise additional circuitry (e.g., logic circuitry or other supporting circuitry) configured to interact with the CAM. The string matching circuits 240A-240n are configured to compare a received binary value to one or more stored binary values to determine whether a match exists between the received binary value and the one or more stored binary values. The stored binary values are, for example, binary representations of the strings of the regular expression.

Each of the string matching circuits 240A-240n may store binary representations of any number of the strings of the regular expression for comparison to received binary data (e.g., the data packets). The binary representations of strings are, in some embodiments, a concatenation of the binary representations of the substrings which together form the string. In some embodiments, each string matching circuit 240A-240n is configured to match the received binary data to stored binary representations having a same length. For example, each string matching circuit 240A-240n may store binary representations of strings having a same length or number of characters such that the string matching circuit 240A stores and provides matching for binary representations of one or more strings having a first number of characters, the string matching circuit 240B stores and provides matching for binary representations of one or more strings having a second number of characters, etc. Each character of the strings is represented in the stored binary representation by any number of bits (e.g., eight bits per character), and each bit of the binary representation is stored, in some embodiments, separately in the string matching circuits 240A-240n (e.g., with each bit being stored in a separate static random access memory (SRAM) cell (not shown)).

Each of the string matching circuits 240A-240n separately receives the data packet comprising the binary data from the first controller 210. The plurality of binary bits of the received data packets are compared by the string matching circuits 240A-240n to the stored binary representations of the strings and a binary output is generated by the string matching circuits 240A-240n and transmitted to the second controller 220. The binary output indicates a match or a miss for a respective string of the regular expression. For example, for the three strings of "attack.start.root," discussed above with respect to FIG. 1, the binary output may comprise, in this example, three bits with each bit corresponding to one of the three strings of "attack", "start", and "root". When the string matching circuits 240A-240n match any of the strings of the regular expression in the data packets being analyzed, a bit of the binary output corresponding to that string is set to 1. When the string matching circuits 240A-240n do not match any of the strings of the regular expression in the data packets being analyzed, a bit of the binary output corresponding to that string is set to 0.

The second controller 220 is coupled to each of the string matching circuits 240A-240n via lines 236A, 236B, and 236n, respectively, and receives the binary output of each respective string matching circuit 240A-240n and the data packets analyzed by the respective string matching circuits 240A-240n via the lines 236A, 236B, and 236n, respectively. When the binary output indicates that no strings of the regular expression were found in a data packet, in some embodiments the second controller 220 transmits the data packet according to the bypass path 260 that bypasses further analysis of the data packet. When the binary output indicates that one or more strings of the regular expression were found in a data packet, in some embodiments the second controller 220 schedules the data packet for analysis by the regular expression matching circuit 250. For example, the second controller 220 schedules the data packet for analysis by placing the data packet in a queue (not shown) associated with the regular expression matching circuit 250. In some embodiments, the second controller 220 schedules the data packet for analysis by the regular expression matching circuit 250 only when a number of strings greater than a threshold (e.g., 1 string, 2 strings, 5 strings, etc.) are matched by the string matching circuits 240A-240n. In this way, existence of a common string (e.g., such as a common term "start") does not alone cause the data packet to be scheduled for analysis by the regular expression matching circuit 250, while existence of multiple strings greater than a threshold will cause the data packet to be scheduled for analysis by the regular expression matching circuit 250. When a number of string matches identified by the string matching circuits 240A-240n does not exceed the threshold, the second controller 220 may transmit the data packet according to the bypass path 260 that bypasses further analysis of the data packet.

The regular expression matching circuit 250 is coupled to the second controller 220 via line 238 and receives the data packets for further analysis from the second controller 220 (e.g., the data packets in which at least some of the strings of the regular expression were found by the string matching circuits 240A-240n) via the lines 238. The regular expression matching circuit 250 is configured to analyze the received data packets to determine whether the data packets contain the regular expression, in some embodiments, by processing the data packets using one or more finite state machines. The finite state machines may be implemented in hardware and/or software (e.g., software configured for execution by processing logic such as a processor). In some embodiments, the regular expression matching circuit 250 comprises digital processing logic and/or analog circuitry that enables the regular expression matching circuit 250 to store and/or execute the one or more finite state machines. For example, the regular expression matching circuit 250 may comprise a processor, a field programmable gate array (FPGA), a plurality of transistors, and/or other electrical circuitry or components that enable the regular expression matching circuit 250 to analyze the received data packets to determine whether it matches a stored or prescribed value according to the finite state machine.

The finite state machine may be a DFA, a NFA, or a combination of the two. A DFA is a finite state machine in which a transition from a first state to a second state is uniquely determined by the first state and an input to the first state and the transition from the first state to the second state only occurs when the first state receives an input. A transition occurs in the finite state machine when a condition of one state is met, thereby allowing the finite state machine to transition to the next state to determine whether it's condition is met. For example, a state of the finite state machine may be considered as an "if-then" proposition, where if a first state has a value of "x", then finite state machine transitions to a second state (begins determining whether the "if-then" proposition of the second state is met). A NFA is a finite state machine which is not bound by the rules of a DFA (e.g., such that a DFA is also by definition an NFA). In the DFA, for a given input, a state has only one option for a transition. For example, each state in the DFA that accepts a binary input has exactly one transition associated with an input of zero and one transition associated with an input of one. In contrast, in the NFA, for a given input, each state may have multiple options for a transition. For example, each state in the NFA that accepts a binary input may have multiple transitions associated with an input of zero and/or multiple associations with an input of one. For example, in the NFA, when a received input is one, processing in the NFA may proceed to both a second state and a third state whereas processing in the DFA for the same received input would proceed to only one of the first state or the second state.

When the regular expression matching circuit 250 receives the data packets from the second controller 220, in some embodiments, the data packets are processed using the one or more finite state machines (e.g., the NFA, the DFA, or both). In some embodiments, the data packets are processed based on individual binary bits of the data packets. For example, each state of the finite state machines transitions based on a binary bit of the data packet until either the regular expression is found in the data packet or the regular expression is not found in the data packet. In another embodiment, the data packets are processed based on data received from the substring matching circuits 230A-230n and/or the string matching circuits 240A-240n. For example, each state of the finite state machines may transition based on existence of a letter, a substring, and/or a string in the data packet. In some embodiments, existence of the letter, substring, and/or string in the data packet is determined at least in part according to the binary output of at least one of the substring matching circuits 230A-230n and/or the string matching circuits 240A-240n. As such, the regular expression matching circuit 250 may utilize results obtained by the substring matching circuits 230A-230n and/or the string matching circuits 240A-240n when analyzing the data packet for a match of the regular expression. When the regular expression matching circuit 250 determines that the regular expression exists in the data packet (e.g., such that the regular expression matching circuit 250 outputs an indication that a match was found), the data packet may be prevented from continuing on to the next downstream (or upstream) device from the node 130 along the original path of the data packet. For example, the data packet is prevented from continuing on to the next device along the original path of the data packet by dropping the data packet and/or by rerouting the data packet to another network element for further processing, analysis, and/or notification via match found path 270. When the entire regular expression is not present in the data packet, the data packet is forwarded by the regular expression matching circuit 250, for example via the bypass path 260, to be transmitted by the node 130 to a next downstream (or upstream) device in the network architecture 100 along the original path of the data packet.

Analyzing data packets received by the node 130 for existence of the regular expression in a hierarchical manner as described above, in various embodiments, improves throughput of the node 130 by performing searches for a regular expression only when at least some strings of the regular expression are found in received data and performing searches for strings of the regular expression only when at least some substrings of the strings are found in received data. By performing the hierarchical search, received data which has no substrings of the regular expression bypasses further analysis in this manner, therefore increasing the throughput of the node 130 and increasing a speed with which the node 130 is capable of analyzing and forwarding received data.

Figure 3:
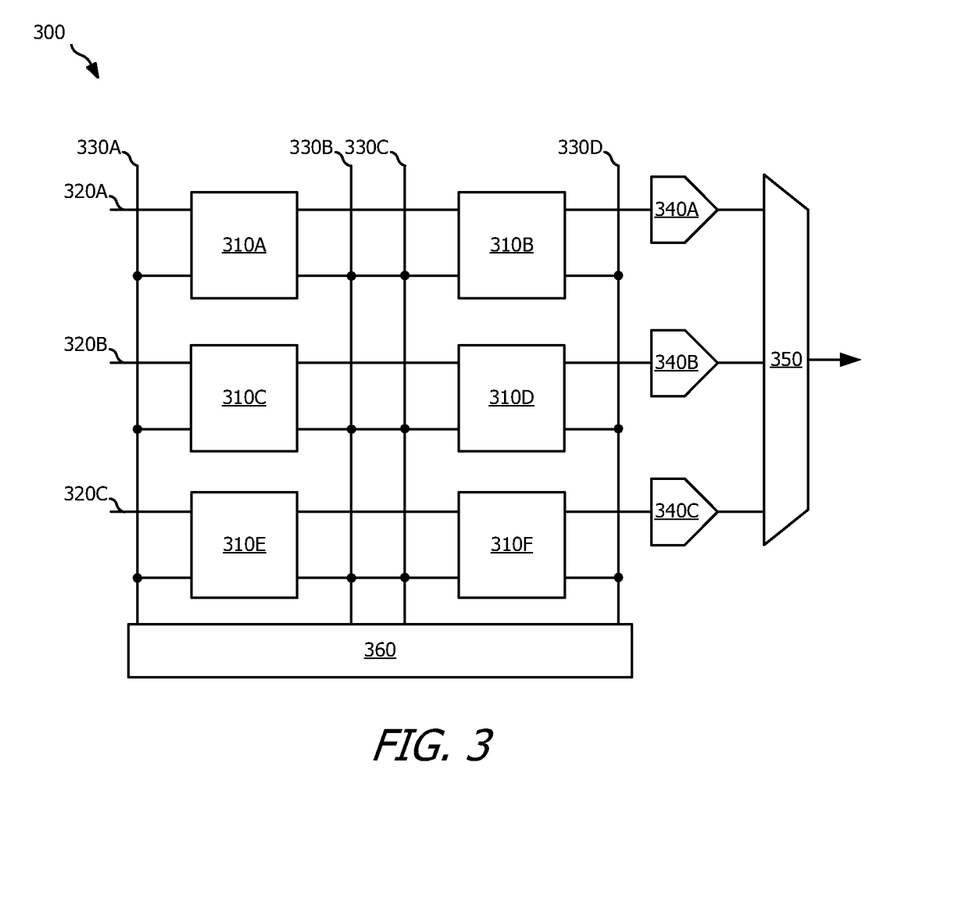
FIG. 3 is an embodiment of a CAM.

Referring now to FIG. 3, an embodiment of a CAM 300 is shown. The CAM 300 is suitable for implementation in the node 130, for example, in at least some of the substring matching circuits 230A-230n and/or at least some of the string matching circuits 240A-240n, as described above with reference to FIG. 2. In at least some embodiments, the CAM is a BCAM.

The CAM 300 comprises a plurality of CAM cores 310A, 310B, 310C, 310D, 310E, and 310F (310A-310F), a plurality of match lines 320A, 320B, and 320C (320A-320C), a plurality of search lines 330A, 330B, 330C, and 330D (330A-330D), a plurality of amplifiers 340A, 340B, and 340C (340A-340C), an encoder 350, and a search data register 360. A number of vertically arranged CAM cores 310A-310F determines a number of unique words (e.g., strings or substrings) which may be searched for by the CAM 300 (e.g., three words as shown in FIG. 3). A number of horizontally arranged CAM cores 310A-310F determines a number of bits of each word which may be searched for by the CAM 300 (e.g., two bits as shown in FIG. 3). To search the substrings, for example, as discussed above with respect to FIG. 2, the substring matching circuits 230A-230n may comprise a CAM 300 having sixteen CAM cores 310A-310F arranged horizontally (e.g., each uniquely corresponding from left to right to one of the bits of the substring of the regular expression) and a number of vertically arranged CAM cores 310A-310F determined according to a number of substrings for which the substring matching circuits 230A-230n will search.

Each CAM core 310A-310F may be implemented as either a NAND-type (having NAND logical functionality)

core or a NOR-type core (having NOR logical functionality) and comprises a plurality of internal components (not shown) such as transistors configured to store a data bit (e.g., such as transistors configured to form an SRAM cell to store a one or a zero), and other components configured to read a value from one or more of the search lines 330A-330D to cause a change to a value on one of the match lines 320A-320C. Each of the CAM cores 310A-310F may be implemented using any structure suitable for performing the disclosed functions and a particular structure of the CAM cores 310A-310F is not limited herein.

The CAM cores 310A-310F each store one bit of data. The search data register 360 stores a binary representation of a word (e.g., character, string, substring, etc.) that is being searched for among the CAM cores 310A-310F and controls a value of the search lines 330A-330D. The search data register 360 sets a value of the search lines 330A-330F according to a value of a corresponding bit in the search data register 360 that will be searched for in a column of the CAM 300. For example, the search data register 360 sets a value of the search line 330A to zero when a corresponding bit in the search data register 360 that will be searched for in the CAM cores 310A, 310C, and 310E is zero. In addition, the search data register 360 sets a value of the search line 330B to an inverse of the value of the search line 330A (e.g., such that the value of the search line 330B is one when the value of the search line 330A is one and vice versa). Similarly, values of the search lines 330C and 330D are set to a value and inverse, respectively, of a corresponding bit in the search data register 360 that will be searched for in the CAM cores 310B, 310D, and 310F. Prior to beginning to search for data stored in the search data register 360 in the CAM cores 310A-310F, the match lines 320A-320C are set to one (e.g., by charging the match lines 320A-320C to a voltage above a threshold for indicating presence of a digital one by providing a voltage on the match lines 320A-320C). When a bit in the search data register 360 is found in a respective CAM core 310A-310F being searched, the respective CAM core 310A-310F does not modify the value of a corresponding match line 320A-320F. When a bit in the search data register 360 is not found in a respective CAM core 310A-310F being searched, the respective CAM core 310A-310F creates a path to ground from the corresponding match line 320A-320F, thereby discharging the corresponding match line 320A-320C and setting to zero.

The amplifiers 340A-340C detect a value of a corresponding match line 320A-320C. When an amplifier 340A-340C detects a corresponding match line 320A-320C has a value of one, the word in the search data register 360 matches a word stored in the CAM cores 310A-310F corresponding to the respective match line 320A-320C and amplifier 340A-340C. When a match line 320A-320C has the value of one, the corresponding amplifier 340A-340C outputs a one to the encoder 350. When an amplifier 340A-340C detects a corresponding match line 320A-320C has a value of zero, the word in the search data register 360 does not match a word stored in the CAM cores 310A-310F corresponding to the respective match line 320A-320C and amplifier 340A-340C. When a match line 320A-320C has the value of zero, the corresponding amplifier 340A-340C outputs a zero to the encoder 350. The encoder 350 may be any device which is suitable for receiving inputs from the amplifiers 340A-340C and providing an output that indicates which words stored in the search data register 360 were found in the CAM 300. A particular structure of the encoder 350 is not limited herein.

Utilizing the CAM 300 to search for received data within stored data enables a node (e.g., the node 130) implementing the CAM to search for multiple words and multiple bits of each word in parallel resulting in obtaining search results relatively quickly when compared to other methods such as the finite state machines as described above with reference to FIG. 2. In addition, when compared to hardware implementing other search methods such as the finite state machines as described above with reference to FIG. 2, the CAM 300 may consume less physical space and less power, resulting in increased efficiency and cost advantages.

It should be noted that while the CAM 300 is illustrated as having six CAM cores 310A-310F (e.g., configured in a grid having three rows of two CAM cores 310A-310F) configured to search for three words having two bits each, the CAM 300 may instead comprise any number of CAM cores 320A-320F, match lines 320A-320C, search lines 330A-330D, and amplifiers 340A-340C according to a desired number of words to be searched for and a length of those words in bits. A size and configuration of the CAM 300 is not limited herein, and the particular configuration illustrated herein is selected solely for the sake of clarity of description and brevity.

Figure 4:
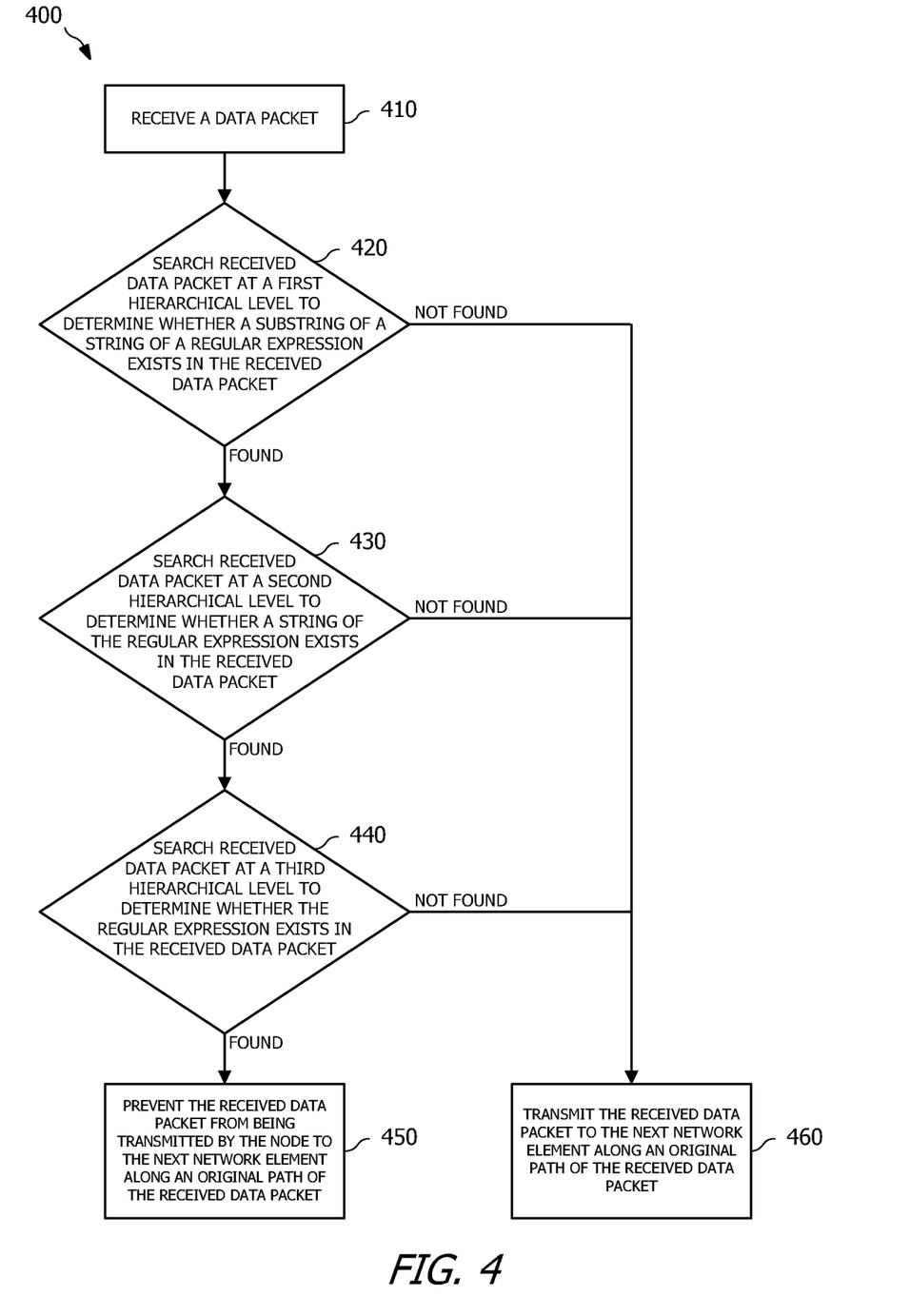
FIG. 4 is a flowchart of an embodiment of a method for hierarchically searching for a regular expression in received data.

Referring now to FIG. 4, a flowchart of an embodiment of a method 400 for hierarchically searching for a regular expression in received data is shown. The method 400 is implemented, for example, by a node such as a node 130 of FIG. 1. The method 400 begins when the node receives a data packet and wishes to determine whether a regular expression exists in the data packet (e.g., such that the node is functioning as a filter, firewall, or other network security device that searches for potentially malicious code (e.g., the regular expression) in the received data.

At operation 410, the node receives a data packet. The data packet is received, for example, from another node, from a client device (e.g., such as the client device 110 of FIG. 1), from a content provider (e.g., such as the content provider 120 of FIG. 1), or from any other source in a network. At operation 420, the node searches the received data packet at a first hierarchical level to determine whether substrings of strings of a regular expression exist in the received data packet. The searching may be performed by software, hardware, or a combination of both. A length of each substring may be the same as other substrings, or the substrings may have varying lengths. The data packet is searched, for example, using a CAM such as the CAM 300 to determine whether substrings stored as binary data in the CAM are present in the received data packet. In other embodiments, when the substrings have a same length, the substrings may be searched against a hashed value to determine whether the substrings are found in the received data packet. When the substrings are found in the received data packet, the method 400 proceeds to operation 430. When the substrings are not found in the received data packet, the received data packet bypasses further analysis by the node and the method 400 proceeds to operation 460.

At operation 430, the node searches the received data packet at a second hierarchical level to determine whether strings of the regular expression exist in the received data packet. The searching may be performed by software, hardware, or a combination of both. The strings may be exact strings (e.g., explicitly specifying all characters of the string) or the strings may include wildcards (e.g., explicitly specifying only some characters of the string). In some embodiments, the results of the search performed at operation 420 may be used at least in part in the searching of operation 430. The data packet is searched, for example, using a CAM such as the CAM 300 to determine whether strings stored as binary data in the CAM are present in the received data packet. In other embodiments, the received data packet may be searched utilizing other types of processors, for example, a numerical processing unit (NPU) or other form of digital logic structure. When the strings are found in the received data packet, the method 400 proceeds to operation 440. When the strings are not found in the received data packet, the received data packet bypasses further analysis by the node and the method 400 proceeds to operation 460.

At operation 440, the node searches the received data packet at a third hierarchical level to determine whether the regular expression exists in the received data packet. The searching may be performed by software, hardware, or a combination of both. The regular expression may be an exact regular expression (e.g., explicitly specifying all strings and/or characters of the regular expression) or the regular expression may include wildcards (e.g., explicitly specifying only some strings and/or characters of the regular expression). In some embodiments, the results of the search performed at operation 420 and/or operation 430 may be used at least in part in the searching of operation 440. The data packet is searched, for example, using a finite state machine such as a NFA or DFA to determine whether the regular expression is present in the received data packet. In other embodiments, the received data packet may be searched utilizing other types of processors, for example, a NPU or other form of digital logic structure, a FPGA, an application specific integrated circuit (ASIC), or any combination thereof. When the regular expression is found in the received data packet, the method 400 proceeds to operation 450. When the regular expression is not found in the received data packet, the method 400 proceeds to operation 460.

At operation 450, when the search of the received data packet at the third hierarchical level finds a match, the received data packet is prevented from being transmitted by the node to the next network element along an original path of the received data packet. For example, the received data packet may be dropped by the node, rerouted to another network element for further analysis, or any other desired operation that prevents the received data packet which may include, for example, the potentially malicious code of the regular expression from reaching its originally intended destination. At operation 460, when the search of the received data packet at the first, second, or third hierarchical level does not match the search criterion, the received data packet is transmitted by the node to the next network element along the original path of the received data packet without searching the received data packet at the third hierarchical level.

It should be noted that the method 400 may include additional operations that are not recited herein and one or more of the operations recited herein may include one or more sub-operations (e.g., additional searches, filtering, or comparisons before proceeding to a next operation). Furthermore, any one or more of the operations recited herein may be omitted, and/or any one or more of the operations recited herein may be performed in an order other than that presented herein, all of which is intended to fall within the scope of the present disclosure.

Figure 5:
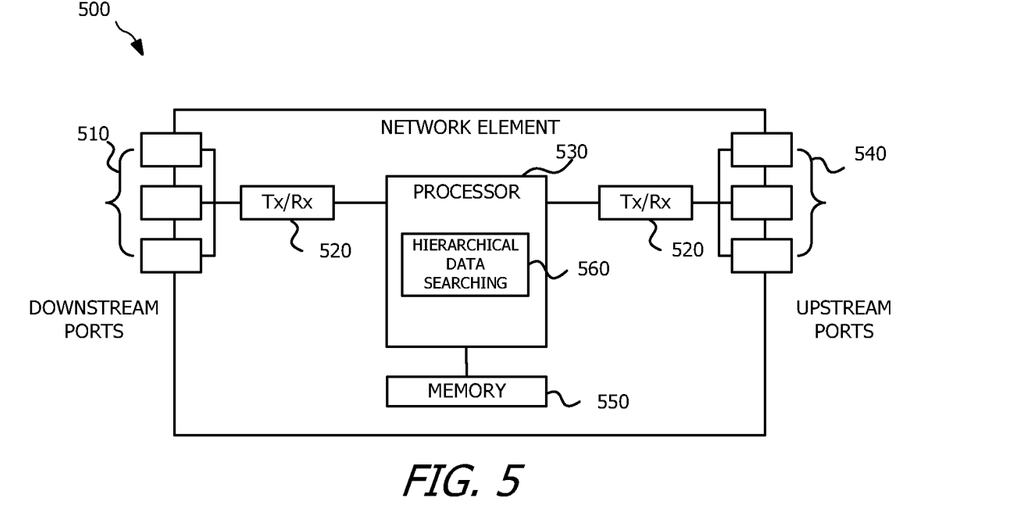
FIG. 5 is a schematic diagram of a network element according to various embodiments of the present disclosure.

Referring now to FIG. 5, a schematic diagram of a network element 500 according to various embodiments of the present disclosure is shown. Network element 500 may be any device capable of receiving data in a network and performing operations based on, or utilizing, the received data. For example, the network element 500 may be a node 130 operating in network architecture 100 as described above with reference to FIGS. 1 and 2, and may include one or more CAMs 300 as described above with reference to FIG. 3. Additionally, the network element 300 is configured to implement the method 400 as described above with reference to FIG. 4 to search received data against stored data. In various embodiments, for instance, the features/ methods of this disclosure are implemented using hardware, firmware, and/or software installed to run on hardware.

Network element 500 is a device (e.g., an access point, an access point station, a router, a switch, a gateway, a bridge, a server, a client, a user-equipment, a mobile communications device, etc.) that transports data through a network, system, and/or domain, and/or provides services to other devices in a network or performs computational functions. In one embodiment, the network element 500 is an apparatus and/or system comprising the node 130 disclosed herein.

The network element 500 comprises one or more downstream ports 510 coupled to a transceiver (Tx/Rx) 520, which are transmitters, receivers, or combinations thereof. The Tx/Rx 520 transmits and/or receives frames from other network elements via the downstream ports 510. Similarly, the network element 500 comprises another Tx/Rx 520 coupled to a plurality of upstream ports 540, wherein the Tx/Rx 520 transmits and/or receives frames from other nodes via the upstream ports 540. The downstream ports 510 and/or the upstream ports 540 may include electrical and/or optical transmitting and/or receiving components. In another embodiment, the network element 500 comprises one or more antennas (not shown) coupled to the Tx/Rx 520. The Tx/Rx 520 transmits and/or receives data (e.g., packets) from other computing or storage devices wirelessly via the one or more antennas.

A processor 530 is coupled to the Tx/Rx 520 and is configured to perform communication between the network element 500 and another network element, for example, according to one or more burst mode transmissions. In an embodiment, the processor 530 comprises one or more multi-core processors and/or memory modules 550, which functions as data stores, buffers, etc. The processor 530 is implemented as a general processor or as part of one or more ASICs, FPGAs, and/or digital signal processors (DSPs). Although illustrated as a single processor, the processor 530 is not so limited and alternatively comprises multiple processors. The processor 530 further comprises processing logic configured to execute hierarchical data searching 560 (e.g., by implementing at least some of the method 400). For example, the processing logic may comprise any one or more of a finite state machine, a CAM, or other similar processing functions.

FIG. 5 also illustrates that a memory module 550 is coupled to the processor 530 and is a non-transitory medium configured to store various types of data. Memory module 550 comprises memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 550 may be used to house the instructions for carrying out the various embodiments described herein. For example, the memory module 550 may comprise instructions configured to implement hierarchical data searching 560, which is executed by processor 530. For example, the memory module 550 may comprise instructions configured to implement the method 400 when executed by the processor 530.

It is understood that by programming and/or loading executable instructions onto the network element 500, at least one of the processor 530 and/or the memory module 550 are changed, transforming the network element 500 in part into a particular machine or apparatus, for example, an amplifier architecture having the novel automatic gain control functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware (e.g., in an ASIC) because for large production runs the hardware implementation may be less expensive than software implementations. Often a design may be developed and tested in a software form and then later transformed, by design rules well-known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Disclosed herein are various embodiments comprising a means for hierarchical analysis of data to determine existence of, for example but not limited to, potentially malicious code included within the data. The disclosed means are implemented, in some embodiments, by a network element. The network element operates, in some embodiments, as a filter or firewall that searches received data against stored data prior to transmitting the received data to a next node along an intended or original path of the received data. The disclosed embodiments provide a means for hierarchically searching, at a first level, to determine whether substrings of the stored data are found in the received data, hierarchically searching, at a second level, to determine whether strings of the stored data are found in the received data, and hierarchically searching, at a third level, to determine whether a regular expression of the stored data is found in the received data. When a match between the received data and the stored data is not found at a level of the hierarchical analysis, disclosed embodiments provide a means for the received data to be transmitted to a next node along an intended or original path of the received data without undergoing further analysis according to the remaining levels of the hierarchical analysis. The disclosed embodiments provide a means for the hierarchical analysis to be performed according to hardware, software, or a combination of both. For example, the disclosed embodiments provide a means for the hierarchical analysis to be at least partially implemented using hardware capable of searching for multiple substrings or strings in parallel to result in a comparatively fast search time. The hardware may further have a comparatively small physical size, component count, and power consumption, thereby increasing an efficiency of the hierarchical analysis.

A computer-readable non-transitory media includes all types of computer readable media, including magnetic storage media, optical storage media, and solid state storage media and specifically excludes signals. It should be understood that the software can be installed in and sold with a device. Alternatively the software can be obtained and loaded into a device, including obtaining the software via a disc medium or from any manner of network or distribution system, including, for example, from a server owned by the software creator or from a server not owned but used by the software creator. The software can be stored on a server for distribution over the Internet, for example.

Additional embodiments are cited in the following clauses.

Clause 1. An apparatus, comprising:
a memory comprising executable instructions; and
one or more processors coupled to the memory, wherein the one or more processors execute the instructions to:
receive a data packet;
search the received data packet at a first hierarchical level to determine whether a substring of a string of a regular expression exists in the received data packet;
search the received data packet at a second hierarchical level when the search of the received data packet at the first hierarchical level finds a match to determine whether the string of the regular expression exists in the received data packet; and
transmit the received data packet to the next network element along an original path of the received data packet without searching the received data packet at a third hierarchical level when the search of the received data packet at the first or second hierarchical level does not find a match.

Clause 2. The apparatus of clause 1, further comprising a first CAM, wherein the one or more processors execute the instructions to search the received data packet at the first hierarchical level at least in part using the first CAM.

Clause 3. The apparatus of any of clauses 1-2, wherein the first CAM stores the substring as a plurality of binary bits which are each individually searchable.

Clause 4. The apparatus of any of clauses 1-3, wherein the received data packet comprises a plurality of binary bits, wherein the first CAM is configured to compare the plurality of binary bits of the received data packet to the plurality of binary bits of the substring in parallel.

Clause 5. The apparatus of any of clauses 1-4, further comprising a second CAM, wherein the one or more processors execute the instructions to search the received data packet at the second hierarchical level at least in part using the second CAM.

Clause 6. The apparatus of any of clauses 1-5, wherein the second CAM stores the string as a binary value comprising a plurality of binary bits which are each individually searchable.

Clause 7. The apparatus of claim 1, wherein the one or more processors further execute the instructions to:
receive a second data packet;

search the received second data packet at the first hierarchical level to determine whether a second substring of a second string of a second regular expression exists in the received second data packet;

search the received second data packet at the second hierarchical level when the search of the received second data packet at the first hierarchical level finds a match to determine whether the second string of the second regular expression exists in the received second data packet;

search the received second data packet at a third hierarchical level to determine whether the second regular expression exists in the received second data packet;

prevent transmission of the received second data packet to the next network element along an original path of the received data packet when the search of the received data packet at the third hierarchical level finds a match; and transmit the received second data packet to the next network element along an original path of the received second data packet when the search of the received data packet at the third hierarchical level does not find a match.

Clause 8. An apparatus, comprising:

a first BCAM configured to search for a substring of a string of a regular expression in a received data packet;

a second BCAM configured to search for the string in the received data packet when the substring is found in the received data packet; and a first processor programmed to search for the regular expression in the received data packet when the string is found in the received data packet.

Clause 9. The apparatus of clause 8, wherein the first processor is further programmed to implement a finite state machine to search for the regular expression.

Clause 10. The apparatus of any of clauses 8-9, wherein the finite state machine is at least one of a deterministic finite state machine or a non-deterministic finite state machine.

Clause 11. The apparatus of any of clauses 8-10, wherein the first BCAM is configured to:

store a binary representation of the substring comprising a plurality of bits;

compare the plurality of bits of the substring to a plurality of bits of the received data packet; and output a match result indicating a match between the substring and the received data packet when the plurality of bits of the substring matches the plurality of bits of the received data packet.

Clause 12. The apparatus of any of clauses 8-11, wherein the second BCAM is configured to:

store a binary representation of the string comprising a plurality of bits;

compare the plurality of bits of the string to a plurality of bits of the received data packet; and output a match result indicating a match between the string and the received data packet when the plurality of bits of the string matches the plurality of bits of the received data packet.

Clause 13. The apparatus of any of clauses 8-12, further comprising a second processor programmed to:

schedule the received data packet for analysis by the second BCAM when the first BCAM determines that the substring is found in the received data packet; and transmit the received data packet according to a bypass path that bypasses the second BCAM and the first processor when the first BCAM determines that the substring is not found in the received data packet.

Clause 14. The apparatus of any of clauses 8-13, further comprising a third processor configured to:

schedule the received data packet for analysis by the first processor when the second BCAM determines that the string is found in the received data packet; and transmit the received data packet according to a bypass path that bypasses the first processor when the second BCAM determines that the string is not found in the received data packet.

Clause 15. A method, comprising:

receiving, by a network element, a data packet;

searching, by the network element, the received data packet at a first hierarchical level to determine whether a substring of a string of a regular expression exists in the received data packet;

searching, by the network element when the search of the received data packet at the first hierarchical level finds a match, the received data packet at a second hierarchical level to determine whether the string of the regular expression exists in the received data packet; and transmitting, by the network element, the received data packet to a next network element along an original path of the received data packet without searching the received data packet at a third hierarchical level when the search of the received data packet at the first or second hierarchical level does not find a match.

Clause 16. The method of clause 15, further comprising:

searching, by the network element when the search of the received data packet at the second hierarchical level finds a match, the received data packet at the third hierarchical level to determine whether the regular expression exists in the received data packet;

preventing, by the network element, transmission of the received data packet to the next network element along the original path of the received data packet when the search of the received data packet at the third hierarchical level finds a match;

transmitting, by the network element, the received data packet to the next network element along an original path of the received data packet without searching the received data packet at the third hierarchical level when the search of the received data packet at the first or second hierarchical level does not find a match; and transmitting, by the network element, the received data packet to the next network element along an original path of the received data packet when the search of the received data packet at the third hierarchical level does not find a match.

Clause 17. The method of any of clauses 15-16, wherein the network element performs the searching at the first hierarchical level and the second hierarchical level using a plurality of CAMs.

Clause 18. The method of any of clauses 15-17, wherein at least one of the CAMs is a binary CAM.

Clause 19. The method of any of clauses 15-18, wherein the network element performs the searching at the third hierarchical level using a finite state machine.

Clause 20. The method of any of clauses 15-19, wherein the network element is further configured to transmit the received data packet to a second network element for further analysis when the search of the received data packet at the third hierarchical level finds a match.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. The use of the term "about" means+/−10 percent of the subsequent number, unless otherwise stated. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus, comprising:
   a first content addressable memory (CAM) storing a substring of a string of a regular expression as a plurality of bits that are individually searchable;
   a memory comprising executable instructions; and
   one or more processors coupled to the memory wherein the one or more processors execute the instructions to:
      receive a data packet comprising a plurality of bits;
      search the received data packet at a first hierarchical level using, at least in part, the first CAM and compare in parallel the plurality of bits of the received data packet to the plurality of bits of the substring to determine whether the substring of the string of the regular expression exists in the received data packet;
      search the received data packet at a second hierarchical level when the search of the received data packet at the first hierarchical level finds a match, to determine whether the string of the regular expression exists in the received data packet; and
      transmit the received data packet to a next network element along an original path of the received data packet without searching the received data packet at a third hierarchical level when the search of the received data packet at the first or second hierarchical level does not find a match.

2. The apparatus of claim 1, further comprising a second CAM, wherein the one or more processors execute the instructions to search the received data packet at the second hierarchical level at least in part using the second CAM.

3. The apparatus of claim 2, wherein the second CAM stores the string as a binary value comprising a plurality of binary bits which are each individually searchable.

4. The apparatus of claim 1, wherein the one or more processors further execute the instructions to:
   receive a second data packet;
   search the received second data packet at the first hierarchical level to determine whether a second substring of a second string of a second regular expression exists in the received second data packet;
   search the received second data packet at the second hierarchical level when the search of the received second data packet at the first hierarchical level finds a match to determine whether the second string of the second regular expression exists in the received second data packet;
   search the received second data packet at a third hierarchical level to determine whether the second regular expression exists in the received second data packet;
   prevent transmission of the received second data packet to the next network element along an original path of the received data packet when the search of the received data packet at the third hierarchical level finds a match; and
   transmit the received second data packet to the next network element along an original path of the received second data packet when the search of the received data packet at the third hierarchical level does not find a match.

5. An apparatus, comprising:
   a first binary content addressable memory (BCAM) configured to search for a substring of a string of a regular expression in a received data packet;
   a second BCAM configured to search for the string in the received data packet when the substring is found in the received data packet;
   a first processor programmed to search for the regular expression in the received data packet when the string is found in the received data packet; and
   a second processor programmed to:
      schedule the received data packet for analysis by the second BCAM when the first BCAM determines that the substring is found in the received data packet, and
      transmit the received data packet according to a bypass path that bypasses the second BCAM and the first processor when the first BCAM determines that the substring is not found in the received data packet.

6. The apparatus of claim 5, wherein the first processor is programmed to implement a finite state machine to search for the regular expression.

7. The apparatus of claim 6, wherein the finite state machine is at least one of a deterministic finite state machine or a non-deterministic finite state machine.

8. The apparatus of claim 5, wherein the first BCAM is configured to:
   store a binary representation of the substring comprising a plurality of bits;
   compare the plurality of bits of the substring to a plurality of bits of the received data packet; and
   output a match result indicating a match between the substring and the received data packet when the plurality of bits of the substring matches the plurality of bits of the received data packet.

9. The apparatus of claim 5, wherein the second BCAM is configured to:
   store a binary representation of the string comprising a plurality of bits;
   compare the plurality of bits of the string to a plurality of bits of the received data packet; and
   output a match result indicating a match between the string and the received data packet when the plurality of bits of the string matches the plurality of bits of the received data packet.

10. The apparatus of claim 5, further comprising a third processor configured to:
    schedule the received data packet for analysis by the first processor when the second BCAM determines that the string is found in the received data packet; and
    transmit the received data packet according to a bypass path that bypasses the first processor when the second BCAM determines that the string is not found in the received data packet.

11. A method, comprising:
    receiving, by a network element, a data packet comprising a plurality of bits;

searching, by the network element, the received data packet at a first hierarchical level using, at least in part, a first content addressable memory (CAM) storing a substring of a string of a regular expression as a plurality of bits that are individually searchable and comparing in parallel the plurality of bits of the received data packet to the plurality of bits of the substring to determine whether the substring of the string of the regular expression exists in the received data packet;

searching, by the network element the received data packet at a second hierarchical level when the search of the received data packet at the first hierarchical level finds a match, to determine whether the string of the regular expression exists in the received data packet; and transmitting, by the network element, the received data packet to a next network element along an original path of the received data packet without searching the received data packet at a third hierarchical level when the search of the received data packet at the first or second hierarchical level does not find a match.

12. The method of claim 11, further comprising:

searching, by the network element when the search of the received data packet at the second hierarchical level finds a match, the received data packet at the third hierarchical level to determine whether the regular expression exists in the received data packet;

preventing, by the network element, transmission of the received data packet to the next network element along the original path of the received data packet when the search of the received data packet at the third hierarchical level finds a match;

transmitting, by the network element, the received data packet to the next network element along an original path of the received data packet when the search of the received data packet at the third hierarchical level does not find a match.

13. The method of claim 11, wherein the network element performs the searching at the first hierarchical level and the second hierarchical level using a plurality of content addressable memories (CAMs).

14. The method of claim 13, wherein at least one of the CAMs is a binary CAM.

15. The method of claim 11, wherein the network element performs the searching at the third hierarchical level using a finite state machine.

16. The method of claim 11, wherein the network element is further configured to transmit the received data packet to a second network element for further analysis when the search of the received data packet at the third hierarchical level finds a match.

* * * * *